(12) United States Patent
Wu et al.

(10) Patent No.: US 10,091,470 B2
(45) Date of Patent: Oct. 2, 2018

(54) PROJECTION DEVICE AND LIGHT SOURCE DRIVING METHOD THEREOF

(71) Applicant: Coretronic Corporation, Hsin-Chu (TW)

(72) Inventors: Chia-Keng Wu, Hsin-Chu (TW); Yen-Yu Chou, Hsin-Chu (TW); Fu-Shan Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/865,280

(22) Filed: Jan. 9, 2018

(65) Prior Publication Data

US 2018/0199013 A1   Jul. 12, 2018

(30) Foreign Application Priority Data

Jan. 10, 2017   (CN) .......................... 2017 1 0016763

(51) Int. Cl.
  *G03B 21/14*   (2006.01)
  *H04N 9/31*    (2006.01)
  (Continued)

(52) U.S. Cl.
  CPC ......... *H04N 9/3117* (2013.01); *G02B 26/008* (2013.01); *G02B 27/18* (2013.01); *G03B 21/567* (2013.01); *H04N 9/312* (2013.01)

(58) Field of Classification Search
  CPC .... H04N 9/3117; H04N 9/312; G02B 26/008; G02B 27/18; G03B 21/567
  See application file for complete search history.

(56) References Cited

U.S. PATENT DOCUMENTS

2005/0225731 A1*  10/2005  Kobayashi ........... H04N 9/3114
                                                           353/31
2009/0207384 A1*  8/2009  Honjo .................. G03B 21/008
                                                           353/69
(Continued)

FOREIGN PATENT DOCUMENTS

CN         1707348        12/2005
CN        102650813        8/2012
(Continued)

*Primary Examiner* — Sultan Chowdhury
*Assistant Examiner* — Magda Cruz
(74) *Attorney, Agent, or Firm* — JCIPRNET (57) ABSTRACT

Disclosed are a projection device and a light source driving method thereof. The projection device includes a light source module. The light source driving method includes: driving a blue light source of a light source module to output a blue light beam at a first power and a second power respectively, and driving a red light source of the light source module to output a first red light beam at the first power and the second power respectively, wherein a color wheel module of the light source module converts the blue light beam to generate a second red light beam; sensing luminance of the first red light beam and the second red light beam, and correspondingly generating red light luminance information; calculating red light driving parameters of the red light source and the blue light source according to luminance information of the first red light beam and the second red light beam; and controlling, according to the red light driving parameters, electrical signals for driving the blue light source and the red light source, so as to maintain the sum of luminance of the red light beams to be approximate to or equal to a target red light luminance.

16 Claims, 5 Drawing Sheets

(51) Int. Cl.
  *G02B 27/18* (2006.01)
  *G02B 26/00* (2006.01)
  *G03B 21/56* (2006.01)

(56) References Cited

U.S. PATENT DOCUMENTS

2013/0057661 A1\* 3/2013 Oda ..................... G02B 26/008
                                                             348/51
2015/0241764 A1\* 8/2015 Hung ................. G03B 21/2053
                                                             353/31
2015/0264326 A1\* 9/2015 Hayashi ............... H04N 9/3111
                                                             348/760

FOREIGN PATENT DOCUMENTS

| CN | 104880890 | 9/2015 |
| TW | I446095 | 7/2014 |
| TW | I504832 | 10/2015 |

\* cited by examiner

PROJECTION DEVICE AND LIGHT SOURCE DRIVING METHOD THEREOF

CROSS-REFERENCE TO RELATED APPLICATION

This application claims the priority benefit of China application serial no. 201710016763.9, filed on Jan. 10, 2017. The entirety of the above-mentioned patent application is hereby incorporated by reference herein and made a part of this specification.

BACKGROUND OF THE INVENTION

1. Field of the Invention

The invention relates to an optical device and an element driving method thereof, and more particularly relates to a projection device and a light source driving method thereof.

2. Description of Related Art

At present, requirements of a projection device on color presentation are increasingly high, and a consumer would appreciate a wider gamut presented by an image thereof. In order to be capable of achieving a wider gamut, the projection device may provide beams of different colors by using more than two light sources. For instance, a red light source is applied into a projection device originally having only a blue light source to provide a red light beam. Since the color of the red light beam is very pure, a wider gamut may be achieved. In such the projection device, green or yellow phosphor powder on a phosphor wheel is excited by blue light beams to generate green or yellow light beams. The green light beams are filtered by a green filter on a filter wheel to form green light beams meeting demands. Some yellow light beams are filtered by a red filter to form red light beams, and some yellow light beams pass through a transparent area on the filter wheel to form yellow light beams. The remaining blue light beams penetrate through a hollow part on the phosphor wheel, and then pass through the transparent area on the filter wheel. In order to enhance presentation of red color, a red light source is disposed to a light path of the projection device, such that a red light beam provided by the red light source is mixed with red light passing through the red filter, thereby enhancing the color presentation of the red color.

However, in the prior art, when the blue light source and the red light source output the light beams with different powers, the luminance of each light beam cannot be accurately maintained. Under different temperature conditions or usage time conditions, the luminance of each light beam cannot be accurately maintained. Since different light sources have different aging rates, the luminance and color presentation of the projection device will be seriously affected after the projection device is used for a long time.

The information disclosed in this "Description of Related Art" section is only for enhancement understanding of the background of the invention and therefore it may contain information that does not form the prior art that is already known to a person of ordinary skill in the art. Furthermore, the information disclosed in this "Description of Related Art" section does not mean that one or more problems to be solved by one or more embodiments of the invention were acknowledged by a person of ordinary skill in the art.

SUMMARY OF THE INVENTION

The invention provides a projection device and a light source driving method thereof, capable of maintaining luminance of various color light beams to be preset target luminance.

Other objectives and advantages of the invention may be further understood from the technical features disclosed in the invention.

In order to achieve one, some, or all of the aforementioned objectives or other objectives, an embodiment of the invention provides a projection device. The projection device includes a light source module, a color wheel module, a driver, a luminance sensing element, and a controller. The light source module is configured to provide an illumination beam. The light source module includes a blue light source, a red light source, and a color wheel module. The blue light source is configured to output a blue light beam. The red light source is configured to output a first red light beam. The color wheel module is disposed on a transmission path of the blue light beam. The color wheel module is configured to convert the blue light beam to generate a second red light beam. The driver is electrically connected to the light source module. The driver is configured to drive the blue light source to output the blue light beam at a first power and a second power respectively. The driver is configured to drive the red light source to output the first red light beam at the first power and the second power respectively. The luminance sensing element is configured to sense luminance of the first red light beam and the second red light beam output by the light source module, and correspondingly generating red light luminance information. The controller is electrically connected to the driver and the luminance sensing element. The controller receives the red light luminance information sensed by the luminance sensing element. The controller is configured to calculate red light driving parameters of the red light source and the blue light source according to the red light luminance information. The controller controls, according to the red light driving parameters, the driver to generate electrical signals for driving the blue light source and the red light source respectively, so as to maintain the sum of luminance of the first red light beam and second red light beam, output from the light source module, to be approximate to or equal to a target red light luminance.

In order to achieve one, some, or all of the aforementioned objectives or other objectives, another embodiment of the invention provides a light source driving method of a projection device. The projection device includes a light source module. The light source module includes a blue light source, a red light source, and a color wheel module. The light source driving method includes: driving the blue light source to output a blue light beam at a first power and a second power respectively, and driving the red light source to output a first red light beam at the first power and the second power respectively, wherein the color wheel module is configured to convert the blue light beam to generate a second red light beam; sensing luminance of the first red light beam and the second red light beam output by the light source module, and correspondingly generating red light luminance information; calculating red light driving parameters of the red light source and the blue light source according to the luminance information of the first red light beam and the second red light beam; and controlling, according to the red light driving parameters, electrical signals for driving the blue light source and the red light source, so as to maintain the sum of luminance of the first red light beam and second red light beam, output from the light source module, to be approximate to or equal to a target red light luminance.

Based on the foregoing, the embodiments of the invention have at least one of the following advantages or effects. In the embodiments of the invention, a controller controls, according to a sensing result of a luminance sensing element, a driver to generate an electrical signal for driving a light source, so as to maintain the luminance of a light beam output from a light source module to be target luminance.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
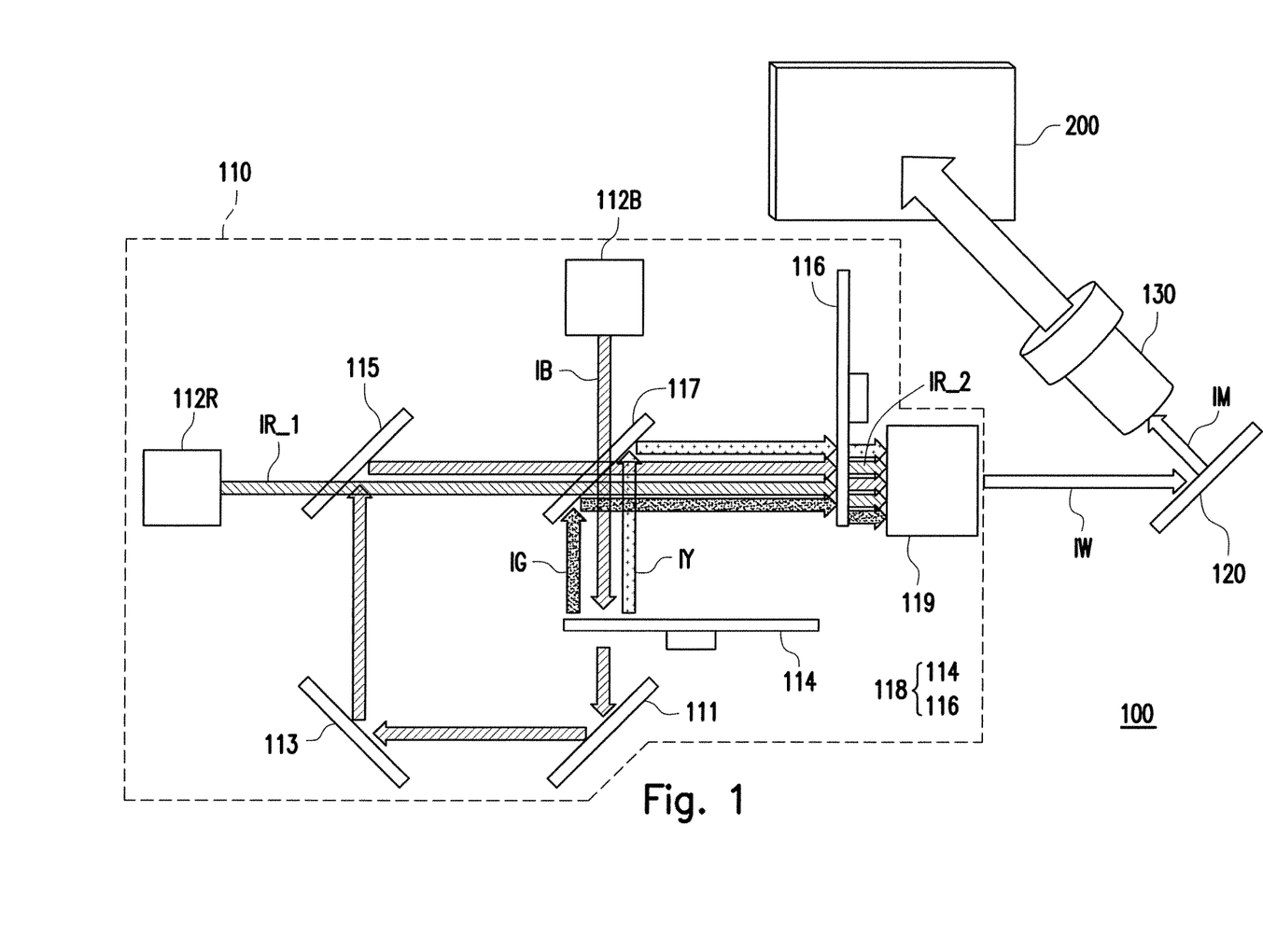
FIG. 1 is a schematic diagram showing a projection device according to an embodiment of the invention.

FIG. 1 is a schematic diagram showing a projection device according to an embodiment of the invention. Referring to FIG. 1, the projection device 100 of the present embodiment includes a light source module 110, an imaging element 120, and a projection lens 130. In the present embodiment, the light source module 110 is configured to provide an illumination beam IW to the imaging element 120. The imaging element 120 is disposed on a transmission path of the illumination beam IW. The imaging element 120 is configured to convert the illumination beam IW into an image beam IM. The projection lens 130 is disposed on a transmission path of the image beam IM. The projection lens 130 is configured to project the image beam IM to a projection target 200 to generate an image picture (not shown). The projection target 200 is, for example, a screen, a plane, or other appropriate projection targets.

In the embodiment, the imaging element 120 is, for example, a reflective optical modulator such as a liquid crystal on silicon (LCoS) panel and a digital micro-mirror device (DMD). The imaging element 120 may also be a penetrable optical modulator such as a transparent liquid crystal panel, an electro-optical modulator, a magneto-optic modulator, and an acousto-optic modulator (AOM). However, the invention does not limit the type and class of the imaging element 120. In the embodiment, detailed steps and embodiments of the method for converting, by the imaging element 120, the illumination beam IW coming from the light source module 110 into the image beam IM may be acknowledged by a person of skill in the art. Therefore, the descriptions thereof are omitted herein.

In the embodiment, the projection lens 130 includes, for example, one or a combination of more optical lenses having diopter, and includes, for example, a concavo-concave lens, a convexo-convex lens, a concavo-convex lens, a convexo-concave lens, a plano-convex lens, a meniscus lens, a plano-concave lens, and a combination of the aforementioned lenses. In an embodiment, the projection lens 130 may also include a planar or non-planar optical lens, for projecting the image beam IM coming from the imaging element 120 into the projection target 200 in a reflective or penetrable manner. The invention does not limit the type and class of the projection lens 130.

In the embodiment, the light source module 110 includes a blue light source 112B, a red light source 112R, a color wheel module 118, multiple reflective elements 111, 113, multiple light combining elements 115, 117, and a light homogenizing element 119 (e.g., an integral column, a fly lens or combination or matching of the aforementioned optical elements, which is not limited in the invention). The color wheel module 118 includes a wavelength conversion wheel 114 and a filter wheel 116. Specifically, in the embodiment, the blue light source 112B is configured to provide a blue light beam IB. The red light source 112R is configured to provide a first red light beam IR_1. The wavelength conversion wheel 114 is disposed on a transmission path of the blue light beam IB. The wavelength conversion wheel 114 is, for example, a phosphor wheel. The wavelength conversion wheel 114 has at least one wavelength conversion area and at least one penetration area, wherein the wavelength conversion area is configured to convert the blue light beam IB to generate a green light beam IG or yellow light beam IY, and the penetration area is configured to allow passage of the blue light beam IB. The filter wheel 116 is disposed on transmission paths of the blue light beam IB and the first red light beam IR_1. The filter wheel 116 is, for example, a color filtering wheel. The filter wheel 116 has at least one filter area and at least one penetration area, wherein the filter area and the penetration area are configured to allow passage of beams of different colors.

In the embodiment, the reflective elements 111, 113 are disposed on the transmission path of the blue light beam IB penetrating through the wavelength conversion wheel 114, and are configured to adjust the transmission path of the blue light beam IB. The light combining element 115 is disposed on the transmission paths of the blue light beam IB and the first red light beam IR_1, and is configured to allow the first red light beam IR_1 to pass therethrough and reflect the blue light beam IB. The light combining element 115 combines the blue light beam IB and the first red light beam IR_1. Moreover, the light combining element 117 is disposed on the transmission paths of the blue light beam IB, the first red light beam IR_1, the green light beam IG, and the yellow light beam IY, and is configured to allow the blue light beam IB and the first red light beam IR_1 to pass therethrough, and reflect the green light beam IG and the yellow light beam IY. The light combining element 117 combines the blue light beam IB, the first red light beam IR_1, the green light beam IG, and the yellow light beam IY. The light homogenizing element 119 is disposed on a light path between the filter wheel 116 and the imaging element 120, and is configured to homogenize a beam to make the penetrating beam evenly output from the light source module 110, thereby avoiding the problem of inconsistence of the projection device 100 on the light path.

In the embodiment, a light source used in the light source module 110 is, for example, a laser diode (LD), a light emitting diode (LED), an organic light-emitting diode (OLED), a LD array, a LED array, or an OLED array. All light sources meeting volume requirements according to the actual design may be implemented, not limited thereto in the invention. In the embodiment, the light combining elements 115, 117, for example, a semi-reflective semi-penetrable lens (also called a dichroic mirror), may deflect the reflected light having been transferred to the lens to other directions, and may allow passage of penetrating light transferred to the lens. In the embodiment, the quantity and disposing positions of the reflective elements 111, 113, the light combining elements 115, 117, and the light homogenizing element 119 are merely used for exemplary illustration instead of limiting the invention. The quantity and disposing positions of these optical elements may be adjusted according to different optical structures configured for the light source module 110.

Figure 2:
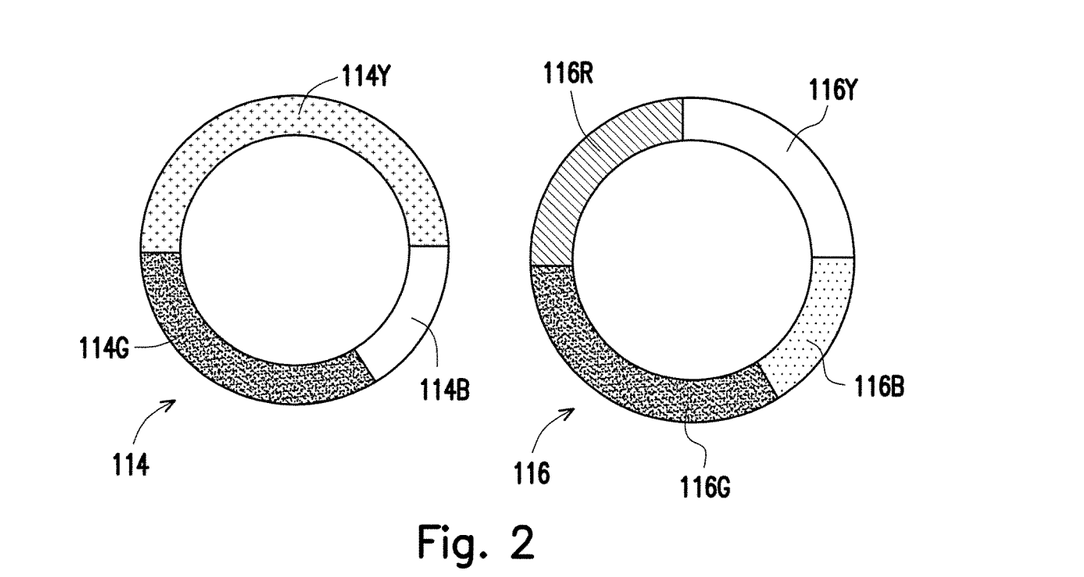
FIG. 2 is a schematic diagram showing a wavelength conversion wheel and a filter wheel according to the embodiment in FIG. 1.

FIG. 2 is a schematic diagram showing a wavelength conversion wheel and a filter wheel according to the embodiment in FIG. 1. Referring to FIG. 1 and FIG. 2, in the embodiment, the wavelength conversion wheel 114 includes a first wavelength conversion area 114G, a second wavelength conversion area 114Y, and a first penetration area 114B. The first wavelength conversion area 114G, the second wavelength conversion area 114Y and the first penetration area 114B are configured to enter a transmission path of a blue light beam IB in turns. When the first wavelength conversion area 114G cuts into the transmission path of the blue light beam IB, the blue light beam IB is converted into a green light beam IG by the first wavelength conversion area 114G. When the second wavelength conversion area 114Y cuts into the transmission path of the blue light beam IB, the blue light beam IB is converted into a yellow light beam IY by the second wavelength conversion area 114Y. The first penetration area 114B is configured to allow passage of the blue light beam IB. In the embodiment, the filter wheel 116 includes a first filter area 116G, a second filter area 116R, and a second penetration area. The second penetration area includes a yellow light penetration section 116Y and a blue light penetration section 116B. The first filter area 116G is configured to allow penetration of the green light beam IG coming from the first wavelength conversion area 114G. The second filter area 116R is configured to allow penetration of a first red light beam IR_1. Moreover, the second filter area 116R is configured to filter a second red light beam IR_2 out of the yellow light beam IY coming from the second wavelength conversion area 114Y. Therefore, the second red light beam IR_2 is filtered out by the second filter area 116 R of the filter wheel 116 after the blue light beam IB is converted into the yellow light beam IY by the second wavelength conversion area 114Y. The yellow light penetration section 116Y is, for example, a transparent glass area, configured to allow penetration of the yellow light beam IY and other color light beams. The blue light penetration section 116B allows passage of the blue light beam IB.

Therefore, in the embodiment, when the first wavelength conversion area 114G cuts into the transmission path of the blue light beam IB and converts the blue light beam IB into the green light beam IG, the first filter area 116G of the filter wheel 116 correspondingly cuts into the transmission path of the green light beam IG, so the light source module 110 may output the green light beam IG. When a section of the second wavelength conversion area 114Y cuts into the transmission path of the blue light beam IB and converts the blue light beam IB into the yellow light beam IY, the second filter area 116R of the filter wheel 116 correspondingly cuts into the transmission path of the yellow light beam IY and filters out the second red light beam IR_2, so the light source module 110 may output the second red light beam IR_2. When another section of the second wavelength conversion area 114Y cuts into the transmission path of the blue light beam IB and converts the blue light beam IB into the yellow light beam IY, the yellow light penetration section 116Y of the filter wheel 116 correspondingly cuts into the transmission path of the yellow light beam IY, so the light source module 110 may output the yellow light beam IY. When the first penetration area 114B cuts into the transmission path of the blue light beam IB, the blue light penetration section 116B of the filter wheel 116 correspondingly cuts into the transmission path of the blue light beam IB, so the light source module 110 may output the blue light beam IB.

Figure 3:
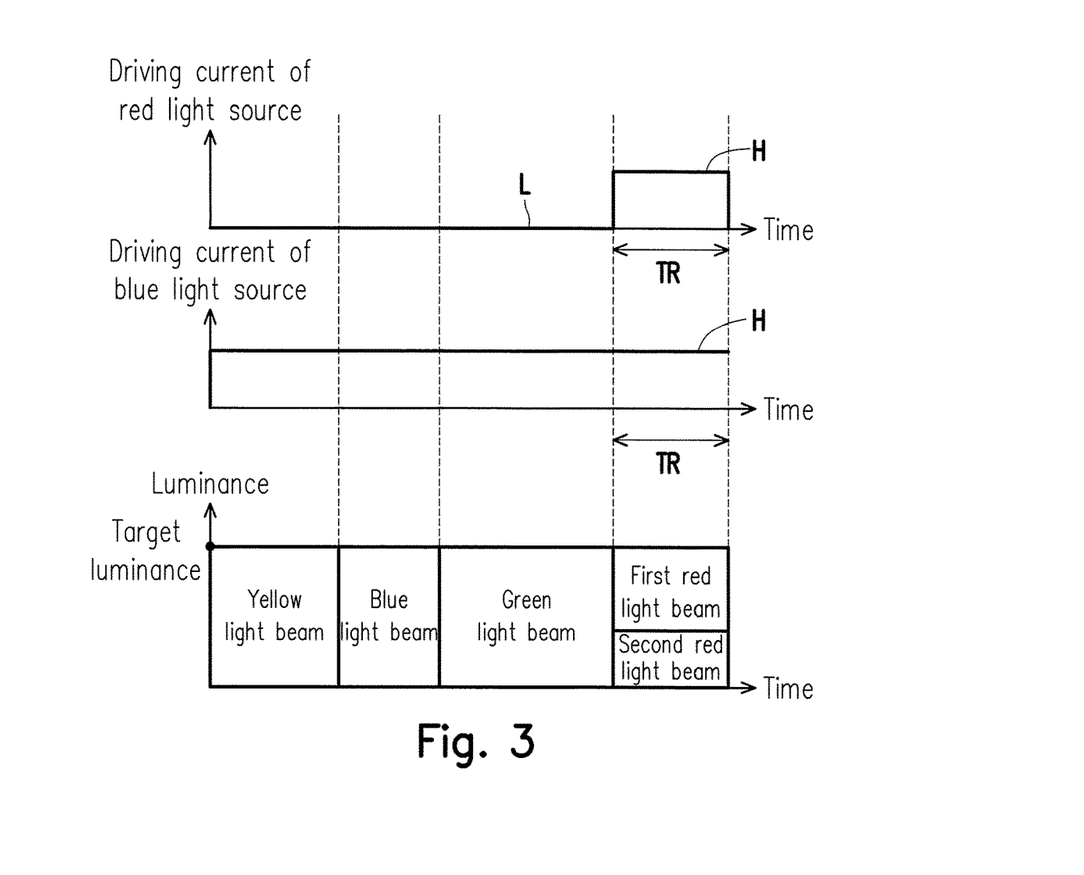
FIG. 3 is a schematic diagram showing a driving current of a light source thereof and target luminance of light beams of different colors during operation according to the embodiments in FIG. 1 and FIG. 2.

FIG. 3 is a schematic diagram showing a driving current of a light source thereof and target luminance of light beams of different colors during operation according to the embodiments in FIG. 1 and FIG. 2, wherein the unit of the driving current is ampere, and the unit of time is millisecond. Referring to FIG. 1, FIG. 2 and FIG. 3, in the embodiment, when the filter wheel 116 is rotated, a driving current of the blue light source 112B is at a high level H, so the blue light source 112B is turned on. The filter wheel 116 outputs a yellow light beam IY, a blue light beam IB, a green light beam IG, and a second red light beam IR_2 in sequence. On the other hand, when the filter wheel 116 outputs the yellow light beam IY, the blue light beam IB, and the green light beam IG, a driving current of the red light source 112R is at a low level L, so the red light source 112R is turned off.

In the embodiment, when the second filter area 116R is rotated into a transmission path of a first red light beam IR_1, for example, during a period TR, the driving current of the red light source 112R switches to be at a high level H. Therefore, the red light source 112R is turned on to provide the first red light beam IR_1. Meanwhile, the driving current of the blue light source 112B also maintains at a high level H. Therefore, the blue light source 112R keeps being turned on, and the filter wheel 116 also outputs the second red light beam IR_2 during the period TR. In other words, in the embodiment, the blue light source 112B is continuously turned on during the period of rotation of the filter wheel 116, that is, the driving current of the blue light source 112B maintains at a high level H, the red light source 112R is turned on during the period TR but turned off during other periods, that is, the driving current of the red light source 112R is at a high level H only during the period TR. Therefore, during the period TR, the first red light beam IR_1 coming from the red light source 112R and the yellow light beam IY converted from the blue light beam IB pass through the second filter area 116R of the filter wheel 116 at the same time, so the light source module 110 outputs the first red light beam IR_1 and the second red light beam IR_2 at the same time during the period TR, the sum of luminance of the output light being the sum of luminance of the first red light beam IR_1 and the second red light beam IR_2. In the present embodiment, for example, as shown in FIG. 3, the luminance of the second red light beam IR_2 formed by the blue light source 112B and the luminance of the first red light beam IR_1 formed by the red light source 112R have a preset proportion such as 1:3. That is, the luminance of the first red light beam IR_1 is higher than that of the second red light beam IR_2. However, it is not limited in the invention.

In the embodiment, when the blue light source 112B is turned on and the red light source 112R is turned off, the luminance of the yellow light beam IY, the luminance of the blue light beam IB and the luminance of the green light beam IG output by the light source module 110 achieve target yellow light luminance, target blue light luminance and target green light luminance respectively. When the blue light source 112B and the red light source 112R are turned on during the period TR, the sum of luminance of the first red light beam IR_1 and the second red light beam IR_2 output by the light source module 110 achieves, for example, a target red light luminance. In FIG. 3, equality of the target yellow light luminance, the target blue light luminance, the target green light luminance and the target red light luminance is taken for exemplary illustration. However, it is not limited in the invention. In another embodiment, any one, two or all of the target yellow light luminance, the target blue light luminance, the target green light luminance and the target red light luminance may be unequal.

Figure 4:
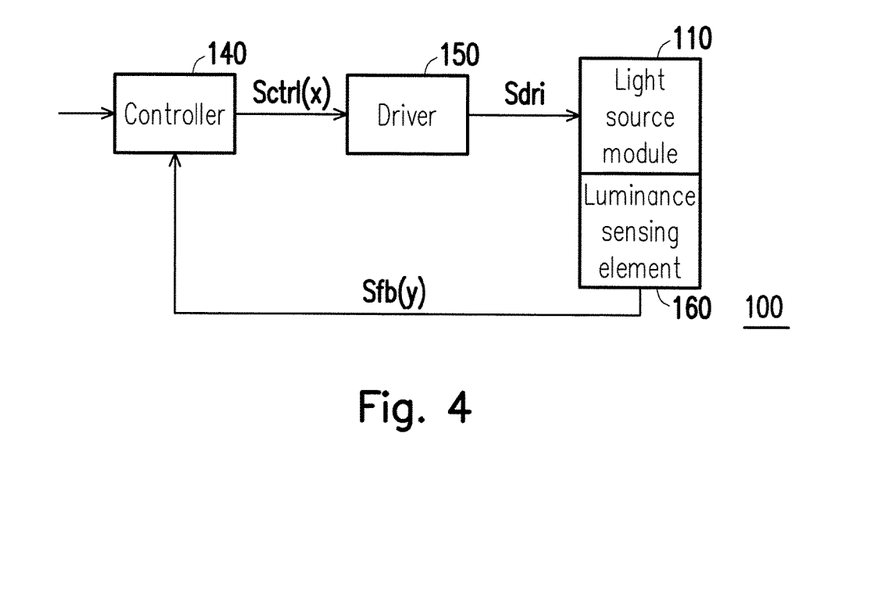
FIG. 4 is a block diagram showing a projection device according to the embodiment in FIG. 1.

FIG. 4 is a block diagram showing a projection device according to the embodiment in FIG. 1. Referring to FIG. 1 and FIG. 4, the projection device 100 of the embodiment further includes a controller 140, a driver 150, and a luminance sensing element 160. The controller 140 is electrically connected to the driver 150 and the luminance sensing element 160. The driver 150 is electrically connected to the light source module 110. In the embodiment, the driver 150 is configured to provide an electrical signal Sdri (e.g., voltage and/or current) to drive the blue light source 112B to output the blue light beam IB with different powers respectively. The driver 150 is configured to provide the electrical signal Sdri to drive the red light source 112R to output the first red light beam IR_1 with different powers respectively. In the embodiment, a voltage value and/or a current value for driving the blue light source 112B are/is different from a voltage value and/or a current value for driving the red light source 112R.

In the embodiment, the luminance sensing element 160 is configured to sense the luminance of the green light beam IG, the yellow light beam IY, the blue light beam IB, the first red light beam IR_1 and the second red light beam IR_2 output from the light source module 110, and correspondingly generates a feedback signal Sfb, wherein the luminance sensing element 160 is configured to, for example, measure the luminance of the yellow light beam IY, the blue light beam IB, the green light beam IG, the first red light beam IR_1 and the second red light beam IR_2 passing through the filter wheel 116 in FIG. 1. The feedback signal Sfb includes green light luminance information, yellow light luminance information, blue light luminance information and red light luminance information. In the embodiment, the controller 140 receives the green light luminance information, the yellow light luminance information, the blue light luminance information and the red light luminance information sensed by the luminance sensing element 160, namely the feedback signal Sfb. The controller 140 is configured to calculate a first red light driving parameter of the red light source 112R according to the green light luminance information, the yellow light luminance information, the blue light luminance information and the red light luminance information, and calculating a green light driving parameter, a yellow light driving parameter, a blue light driving parameter and a second red light driving parameter of the blue light source 112B. A control signal Sctrl provided by the controller 140 may control the driver 150 to generate the electrical signal Sdri for driving the blue light source 112B and the red light source 112R respectively, so as to maintain the luminance of each color light beam output from the light source module 110 or the sum of luminance to be approximate to or equal to target luminance.

In the embodiment, the control signal Sctrl includes the green light driving parameter, the yellow light driving parameter, the blue light driving parameter and the red light driving parameter. The red light driving parameter includes a first red light driving parameter corresponding to the red light source 112R and a second red light driving parameter corresponding to the blue light source 112B. In the embodiment, the controller 140 stores, for example, the calculated driving parameters in a memory (not shown) built therein or a system memory disposed outside same. It is not limited in the invention.

Figure 5:
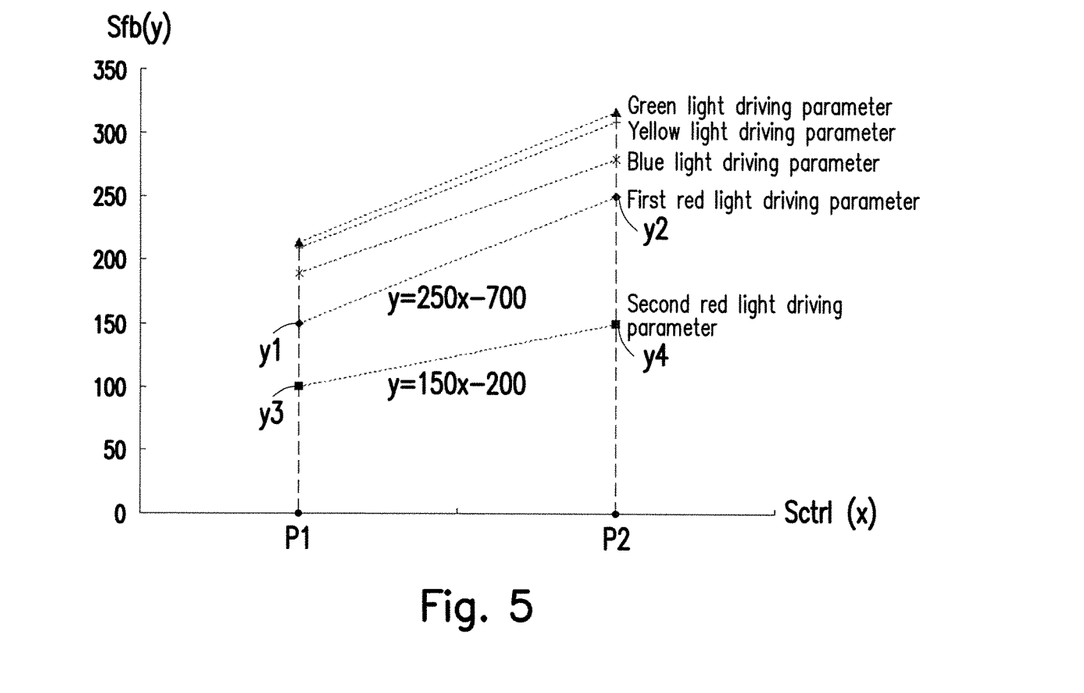
FIG. 5 is a schematic diagram showing a driving parameter according to an embodiment of the invention.

FIG. 5 is a schematic diagram showing a driving parameter according to an embodiment of the invention. Referring to FIG. 5, a horizontal axis of FIG. 5 represents an output power of a light source, a longitudinal axis represents an irradiance of each color light beam, that is, a radiation power (µW/cm2) received in each unit area. Referring to FIG. 4 and FIG. 5 at the same time, the feedback signal Sfb provided by the luminance sensing element 160 in the embodiment includes green light luminance information, yellow light luminance information, blue light luminance information and red light luminance information, wherein the green light luminance information, the yellow light luminance information and the red light luminance information may correspond irradiance of color light beams, and a driving parameter includes, for example, a relation between the output power of the light source and the irradiance of the color light beam. For example, the red light driving parameter calculated by the controller 140 includes the first red light driving parameter and the second red light driving parameter. The first red light driving parameter includes a relation between an output power corresponding to the red light source 112R and a measured irradiance of the first red light beam IR_1. The second red light driving parameter includes a relation between an output power of the blue light source 112B and the measured luminance of the second red light beam IR_2. A blue light driving parameter calculated by the controller 140 includes a relation between the output power of the blue light source 112B and the measured irradiance of the blue light beam IB. A yellow light driving parameter calculated by the controller 140 includes a relation between the output power of the blue light source 112B and the measured irradiance of the yellow light beam IY. A green light driving parameter calculated by the controller 140 includes a relation between the output power of the blue light source 112B and the measured irradiance of the green light beam IG.

Referring to FIG. 1, FIG. 4 and FIG. 5 at the same time, it will be illustrated below how the controller 140 calculates, according to color light luminance information, each color light driving parameter. By taking calculation of the red light driving parameter as an example, the red light driving parameter includes a first red light driving parameter and a second red light driving parameter. When the first red light driving parameter is calculated, the controller 140 controls the driver 150 to drive the red light source 112R, such that the red light source 112R outputs first red light beams IR_1 at a first power P1 and a second power P2 respectively. The first power P1 is, for example, 20% to 30% of the second power P2. Then, the luminance sensing element 160 senses the luminance of the first red light beams IR_1, generates luminance information y1 of the first red light beam IR_1 output at the first power P1 and luminance information y2 of the first red light beam IR_1 output at the second power P2 respectively, and further outputs a feedback signal Sfb to the controller 140. The controller 140 receives the feedback signal Sfb, and calculates the first red light driving parameter according to the red light luminance information y1, y2 (e.g., irradiance) therein and the output powers P1, P2 of the light source. In the embodiment, the luminance of the first red light beam IR_1 output at the first power P1 and the luminance of the first red light beam output at the second power P2 have, for example, a highly linear relation. Therefore, the controller 140 may calculate a linear function of the first red light driving parameter y=250x−700 accordingly. In an embodiment, the first red light driving parameter may be a nonlinear function, and the controller 140 may calculate the nonlinear function according to more pieces of luminance information corresponding to different output powers.

When the second red light driving parameter is calculated, the controller 140 controls the driver 150 to drive the blue light source 112B to output a blue light beam IB at the first power P1 and the second power P2 respectively, and the blue light beam IB is converted by the color wheel module 118 of the light source module 110 to output a second red light beam IR_2. Then, the luminance sensing element 160 senses the luminance of the second red light beam IR_2 output from the light source module 110, generates luminance information y3 of the second red light beam IR_2 output at the first power P1 and luminance information y4 of the second red light beam IR_2 output at the second power P2 respectively, and further outputs a feedback signal Sfb to the controller 140. The controller 140 receives the feedback signal Sfb, and calculates the second red light driving parameter according to the red light luminance information y3, y4 (e.g., irradiance) therein and the output powers P1, P2 of the light source. In the embodiment, the luminance of the second red light beam IR_2 output at the first power P1 and the luminance of the second red light beam output at the second power P2 have, for example, a highly linear relation. Therefore, the controller 140 may calculate a linear function of the second red light driving parameter y=150x−200 accordingly. In an embodiment, the second red light driving parameter may be a nonlinear function, and the controller 140 may calculate the nonlinear function according to more pieces of luminance information corresponding to different output powers.

Therefore, in the embodiment, the red light luminance information includes the luminance information y1, y3 of the first red light beam IR_1 and the second red light beam IR_2 output at the first power P1 and the luminance information y2, y4 of the first red light beam IR_1 and the second red light beam IR_2 output at the second power P2. In the embodiment, if a preset target red light luminance is 400 unit intensity, the unit intensity is unit irradiance, and a luminance ratio of the second red light beam IR_2 to the first red light beam IR_1 is maintained to be 1:3. That is, it is represented that the luminance of the second red light beam IR_2 generated according to the blue light source 112B needs to reach 100 unit intensity and the luminance of the first red light beam IR_1 generated according to the red light source 112R needs to reach 300 unit intensity. According to the aforementioned linear function, it may be calculated that the output power of the blue light source 112B is a light source output power in (100+200)/150=2 units and the output power of the red light source 112R is a light source output power in (300+700)/250=4 units. Therefore, in the embodiment, the controller 140 may control, according to the red light driving parameter, the driver 150 to generate electrical signals Sdri for driving the blue light source 112B and the red light source 112R respectively, such that the blue light source 112B outputs the second red light beam IR_2 at a light source output power in 2 units and the red light source 112R outputs the first red light beam IR_1 at a light source output power in 4 units, thereby maintaining the sum of luminance of the first red light beam IR_1 and the second red light beam IR_2 output from the light source module 110 to be approximate to or equal to the target red light luminance.

In another embodiment of the invention, if the preset target red light luminance is 400 unit intensity, and a luminance ratio of the second red light beam IR_2 to the first red light beam IR_1 is maintained to be 1:3. According to the linear function of the first red light driving parameter, it may be calculated that the output power of the red light source 112R is a light source output power in (300+700)/250=4 units. The controller 140 controls the driver 150 to generate an electrical signal Sdri for driving the red light source 112R, such that the red light source 112R outputs the first red light beam IR_1 with a light source output power in 4 units. Meanwhile, the controller 140 controls the driver 150 to generate an electrical signal Sdri for driving the blue light source 112B, and the electrical signal Sdri is adjusted gradually until the sum of luminance of the first red light beam IR_1 and the second red light beam IR_2 sensed by the luminance sensing element 160 is approximate to or equal to the target red light luminance.

In the embodiment, the calculation method for the green light driving parameter, the yellow light driving parameter and the blue light driving parameter of the blue light source 112B may refer to the aforementioned calculation method for the first red light driving parameter or the second red light driving parameter. The descriptions thereof are omitted herein. Therefore, in the embodiment, the controller 140 may control, according to the yellow light driving parameter, the green light driving parameter and the blue light driving parameter, the driver 150 to generate the electrical signal Sdri for driving the blue light source 112B, so as to maintain the luminance of the yellow light beam IY, the green light beam IG and the blue light beam IB output from the light source module 110 to be approximate to or equal to target yellow light luminance, target green light luminance and target blue light luminance respectively.

In the embodiment, the target yellow light luminance, the target green light luminance, the target blue light luminance and the target red light luminance may be delivered, for example, to the controller 140 via a signal transmission interface from the outside, or may be preset in the projection device 100 and then delivered to the controller 140. For example, the signal transmission interface includes, but is not limited to, a universal asynchronous receiver/transmitter (UART), a serial peripheral interface (SPI) or an inter-integrated circuit bus (I2C bus).

In the present embodiment, the controller 140 includes, for example, a central processing unit (CPU), a microprocessor, a digital signal processor (DSP), a programmable controller, a programmable logic device (PLD) or other similar devices or combination of these devices. It is not limited in the invention. It is not limited to implement the calculation method for the driving parameters in a soft or hard manner in the invention. In the embodiment, the driver 150 may be implemented by the structure of any driver in the technical art respectively, such as a current control circuit or a pulse width modulation (PWM) circuit. However, it is not limited in the invention. The implementation method may gain enough instructions, suggestions and implementation illustrations from general knowledge in the technical art. Therefore, the descriptions thereof are omitted herein. In the present embodiment, the luminance sensing element 160 includes, for example, a photo transistor, a photo diode, a single photoelectric chip integrated with an amplification circuit, or a charge coupled device image sensor (CCD) image sensor or a complementary metal oxide semiconductor (CMOS) image sensor, or other similar devices. It is not limited in the invention.

Figure 6:
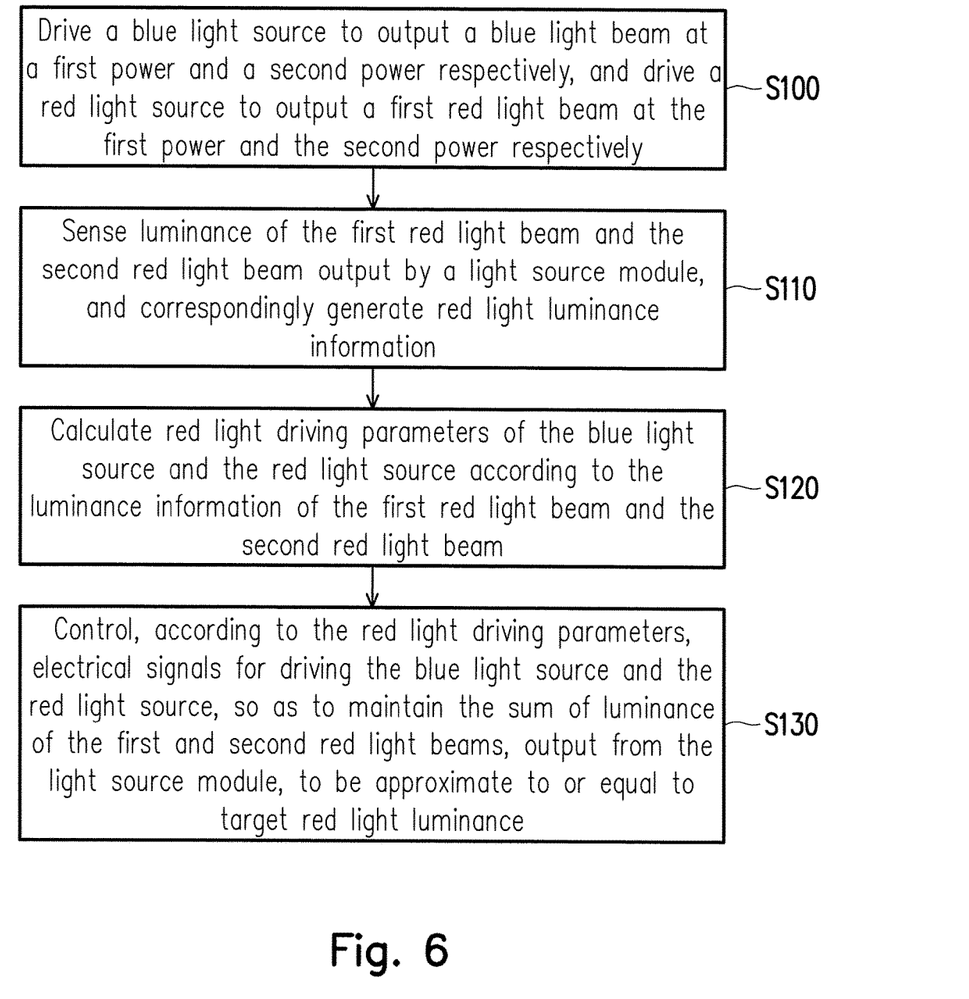
FIG. 6 is a step flowchart showing a light source driving method of a projection device according to an embodiment of the invention.

FIG. 6 is a step flowchart showing a light source driving method of a projection device according to an embodiment of the invention. Referring to FIG. 4 to FIG. 6, the light source driving method of the embodiment is used, at least, for the projection device 100 in FIG. 4. It is not limited in the invention. The projection device 100 in FIG. 4 is taken as an example. In step S100, a driver 150 drives a blue light source 112B to output a blue light beam IB at a first power P1 and a second power P2 respectively, and drives a red light source 112R to output a first red light beam IR_1 at the first power P1 and the second power P2 respectively. In the embodiment, a color wheel module 118 is configured to convert the blue light beam IB to generate a second red light beam IR_2. In step S110, a luminance sensing element 160 senses luminance of the first red light beam IR_1 and the second red light beam IR_2 output by a light source module 110, and correspondingly generates red light luminance information (e.g., irradiance).

Then, in step S120, a controller 140 calculates red light driving parameters of the blue light source 112B and the red light source 112R according to the luminance information of the first red light beam IR_1 and the second red light beam IR_2. Further, the controller 140 calculates the red light driving parameters according to the luminance information (e.g., irradiance) of the first red light beam IR_1 and the second red light beam IR_2 and the output powers P1, P2 of the light sources. In step S130, the controller 140 controls, according to the red light driving parameters, the driver 150 to generate electrical signals Sdri for driving the blue light source 112B and the red light source 112R respectively, so as to maintain the sum of luminance of the first red light beam IR_1 and the second red light beam IR_2, output from the light source module 110, to be approximate to or equal to the target red light luminance.

In the embodiment, the light source driving method for driving the light source module 110 to maintain the luminance of a yellow light beam IY, a blue light beam IB and a green light beam IG output from the light source module 110 to be approximate to or equal to target yellow light luminance, target blue light luminance and target green light luminance respectively may refer to the light source driving method in FIG. 6. The descriptions thereof are omitted herein. The light source driving method of the projection device according to the embodiment of the invention may gain enough instructions, suggestions and implementation illustrations from descriptions in the embodiments from FIG. 1 to FIG. 5. Therefore, the descriptions thereof are omitted herein.

Figure 7:
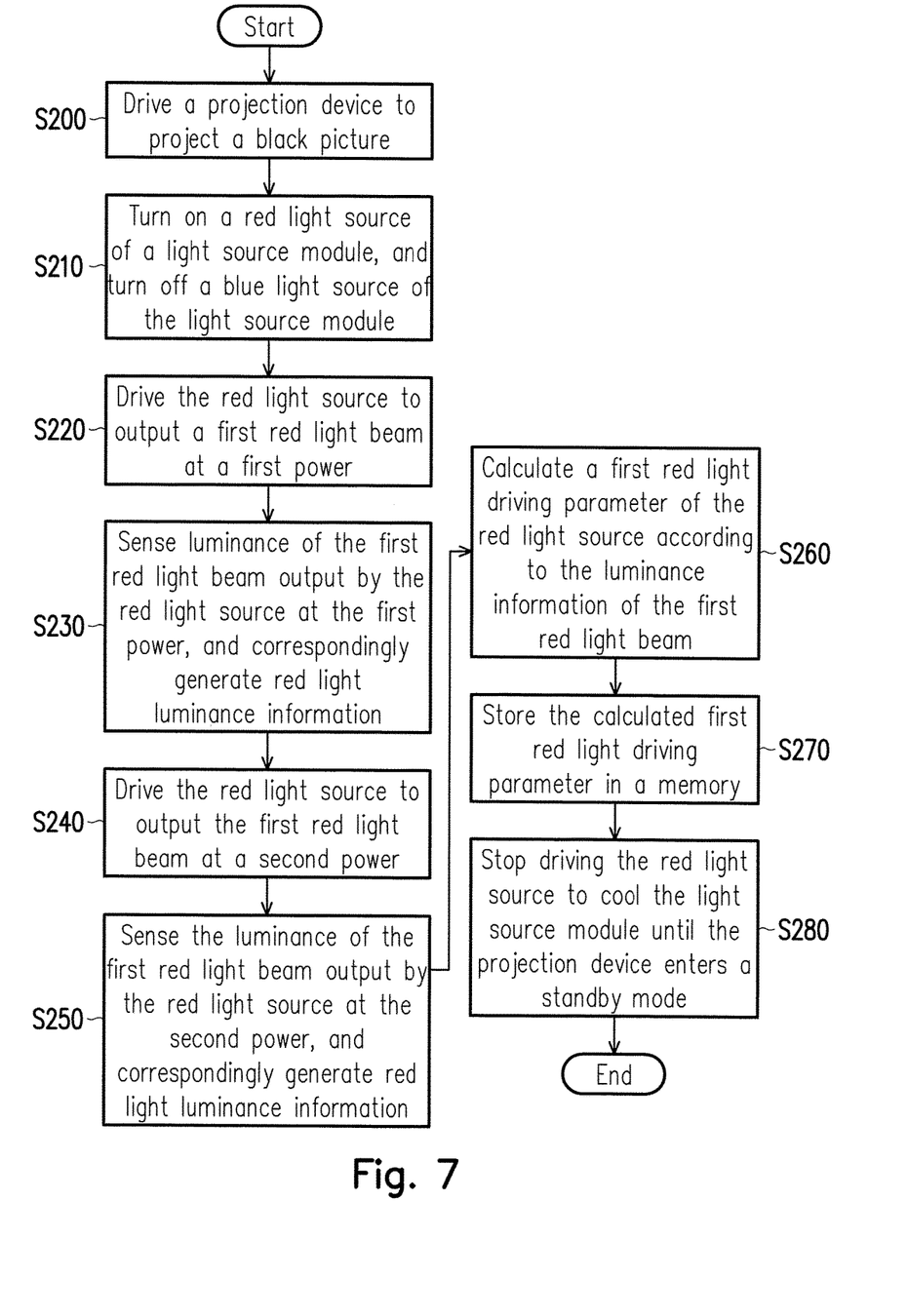
FIG. 7 is a step flowchart showing a light source driving method of a projection device according to another embodiment of the invention.

FIG. 7 is a step flowchart showing a light source driving method of a projection device according to another embodiment of the invention. Referring to FIG. 4 to FIG. 6, the light source driving method of the embodiment is used, at least, for the projection device 100 in FIG. 4. It is not limited in the invention. The projection device 100 in FIG. 4 is taken as example, in step S200, before a blue light source 112B is driven to output a blue light beam IB and a red light source 112R is driven to output a first red light beam IR_1, the projection device 100 is driven to project a black picture to a projection target 200, thereby preventing the quality of a picture projected to the projection target 200 in this flow from being greatly affected. Then, in step S210, a driver 150 turns on the red light source 112R of a light source module 110, and turns off the blue light source 112B of the light source module 110. In step S220, the driver 150 drives the red light source 112R to output the first red light beam IR_1 at a first power P1. In step S230, a luminance sensing element 160 senses luminance of the first red light beam IR_1 output by the red light source 112R at the first power P1, and correspondingly generates red light luminance information.

In step S240, the driver 150 drives the red light source 112R to output the first red light beam IR_1 at a second power P2. In step S250, the luminance sensing element 160 senses luminance of the first red light beam IR_1 output by the red light source 112R at the second power P2, and correspondingly generates red light luminance information. In step S260, the controller 140 calculates a first red light driving parameter of the red light source 112R according to the luminance information of the first red light beam IR_1. In step S270, the controller 140 stores the calculated first red light driving parameter in a memory. In step S280, driving of the red light source 112R is stopped to cool the light source module 110 until the projection device 100 enters a standby mode.

In the embodiment, the driver 150 turns off the red light source 112R and turns on the blue light source 112B, and the light source driving method for driving the blue light source 112B in the light source module 110 to obtain a second red light driving parameter, a green light driving parameter, a yellow light driving parameter and a blue light driving parameter may refer to the light source driving method in FIG. 7. The descriptions thereof are omitted herein. When the projection device 100 operates, the luminance sensing element 160 may automatically and continuously detect the luminance of beams of different colors, generate corresponding luminance information and further feed the information back to the controller 140. The controller 140 controls the output power of each light source according to the luminance information and the first red light driving parameter, the second red light driving parameter, the green light driving parameter, the yellow light driving parameter and the blue light driving parameter stored in the memory, such that each color light beam output by the light source module 110 has stable luminance and color presentation. The light source driving method of the projection device according to the embodiment of the invention may gain enough instructions, suggestions and implementation illustrations from descriptions in the embodiments from FIG. 1 to FIG. 6. Therefore, the descriptions thereof are omitted herein.

Based on the foregoing, the embodiments of the invention have at least one of the following advantages or effects. A light source is driven at different light source output powers, and a controller may control output luminance needed by each color light beam. The light source driving method according to the embodiment of the invention may solve the problems of luminance attenuation and color distortion of a blue light source and a red light source caused by element temperature and aging. The color light luminance output by the light source is automatically detected and compensated by means of the controller and a luminance sensing element without the need of an additional hard compensation circuit. Thus, the cost and size of the projection device may be reduced. The projection device detects color light output by different light sources by means of the luminance sensing element, the controller controls the output power of each light source, and stable luminance and color output may be maintained under different temperature conditions or degrees of element aging. The projection device maintains the same luminance and color presentation output in a luminance feedback control way under the condition that light output of the light source module is not affected by difference of the projection device or usage time. The aforementioned effects may also be presented as for application to multiple light sources (e.g., a light emitting diode or a laser diode having different wavelengths) or a mixed light source (identical gamuts are mixed by different wavelength light source outputs).

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection device, comprising a light source module, a driver, a luminance sensing element, and a controller, wherein the light source module is configured to provide an illumination beam, and the light source module comprises a blue light source, a red light source, and a color wheel module; the blue light source is configured to output a blue light beam, the red light source is configured to output a first red light beam, and the color wheel module is disposed on a transmission path of the blue light beam; the color wheel module is configured to convert the blue light beam to generate a second red light beam;

the driver is electrically connected to the light source module, and is configured to drive the blue light source to output the blue light beam at a first power and a second power respectively, and drive the red light source to output the first red light beam at the first power and the second power respectively;

the luminance sensing element is configured to sense luminance of the first red light beam and the second red light beam output by the light source module, and correspondingly generate red light luminance information; and the controller is electrically connected to the driver and the luminance sensing element, and the controller receives the red light luminance information sensed by the luminance sensing element, and is configured to calculate red light driving parameters of the red light source and the blue light source according to the red light luminance information, the controller controls, according to the red light driving parameters, the driver to generate electrical signals for driving the blue light source and the red light source respectively, so as to maintain the sum of luminance of the first and second red light beams, output from the light source module, to be approximate to or equal to a target red light luminance.

2. The projection device according to claim 1, wherein the luminance of the first red light beam is greater than that of the second red light beam.

3. The projection device according to claim 1, wherein the color wheel module is configured to allow passage of the blue light beam, the luminance sensing element senses luminance of the blue light beam output by the light source module and correspondingly generates blue light luminance information, the controller calculates a blue light driving parameter of the blue light source according to the blue light luminance information, and the controller controls, according to the blue light driving parameter, the driver to drive the electrical signal for driving the blue light source, so as to maintain the luminance of the blue light beam output from the light source module to be approximate to or equal to target blue light luminance.

4. The projection device according to claim 1, wherein the color wheel module is configured to convert the blue light beam to generate a green light beam, the luminance sensing element senses luminance of the green light beam output by the light source module and correspondingly generates green light luminance information, the controller calculates a green light driving parameter of the blue light source according to the green light luminance information, and the controller controls, according to the green light driving parameter, the driver to drive the electrical signal for driving the blue light source, so as to maintain the luminance of the green light beam to be approximate to or equal to target green light luminance.

5. The projection device according to claim 1, wherein the color wheel module is configured to convert the blue light beam to generate a yellow light beam, the luminance sensing element senses luminance of the yellow light beam output by the light source module and correspondingly generates yellow light luminance information, the controller calculates a yellow light driving parameter of the blue light source according to the yellow light luminance information, and the controller controls, according to the yellow light driving parameter, the driver to drive the electrical signal for driving the blue light source, so as to maintain the luminance of the yellow light beam to be approximate to or equal to target yellow light luminance.

6. The projection device according to claim 1, wherein the color wheel module comprises a wavelength conversion wheel and a filter wheel, the wavelength conversion wheel is disposed on a transmission path of the blue light beam and comprises a wavelength conversion area and a first penetration area, the wavelength conversion area is configured to convert the blue light beam to generate a yellow light beam, the first penetration area is configured to allow passage of the blue light beam, the filter wheel is disposed on transmission paths of the yellow light beam and the blue light beam and comprises a filter area and a second penetration area, the filter area is configured to filter the second red light beam out of the yellow light beam, and the second penetration area is configured to allow passage of the blue light beam.

7. The projection device according to claim 1, wherein before the blue light source is driven to output the blue light beam and the red light source is driven to output the first red light beam, the driver drives the projection device to project a black picture.

8. The projection device according to claim 1, wherein the red light driving parameter comprises a relation between an output power of the blue light source and the luminance information of the second red light beam and a relation between an output power of the red light source and the luminance information of the first red light beam.

9. A light source driving method of a projection device, the projection device comprising a light source module, the light source module comprising a blue light source, a red light source and a color wheel module, the light source driving method comprising:
 driving the blue light source to output a blue light beam at a first power and a second power respectively, and driving the red light source to output a first red light beam at the first power and the second power respectively, the color wheel module being configured to convert the blue light beam to generate a second red light beam;
 sensing luminance of the first red light beam and the second red light beam output by the light source module, and correspondingly generating red light luminance information;
 calculating red light driving parameters of the blue light source and the red light source according to the luminance information of the first red light beam and the second red light beam; and
 controlling, according to the red light driving parameters, electrical signals for driving the blue light source and the red light source, so as to maintain the sum of luminance of the first and second red light beams, output from the light source module, to be approximate to or equal to a target red light luminance.

10. The light source driving method according to claim 9, wherein the luminance of the first red light beam is greater than that of the second red light beam.

11. The light source driving method according to claim 9, wherein the color wheel module is configured to allow passage of the blue light beam, and the light source driving method further comprises:
 sensing luminance of the blue light beam output by the light source module, and correspondingly generating blue light luminance information;
 calculating a blue light driving parameter of the blue light source according to the blue light luminance information; and
 controlling, according to the blue light driving parameters, the electrical signal for driving the blue light source, so as to maintain the sum of luminance of the blue light beam to be approximate to or equal to target blue light luminance.

12. The light source driving method according to claim 9, wherein the color wheel module is configured to convert the blue light beam to generate a green light beam, and the light source driving method further comprises:
 sensing luminance of the green light beam output by the light source module, and correspondingly generating green light luminance information;
 calculating a green light driving parameter of the blue light source according to the green light luminance information; and
 controlling, according to the green light driving parameters, the electrical signal for driving the blue light source, so as to maintain the sum of luminance of the green light beam to be approximate to or equal to target green light luminance.

13. The light source driving method according to claim 9, wherein the color wheel module is configured to convert the blue light beam to generate a yellow light beam, and the light source driving method further comprises:
 sensing luminance of the yellow light beam output by the light source module, and correspondingly generating yellow light luminance information;
 calculating a yellow light driving parameter of the blue light source according to the yellow light luminance information; and
 controlling, according to the yellow light driving parameters, the electrical signal for driving the blue light source, so as to maintain the sum of luminance of the yellow light beam to be approximate to or equal to target yellow light luminance.

14. The light source driving method according to claim 9, wherein the color wheel module comprises a wavelength conversion wheel and a filter wheel, the wavelength conversion wheel is disposed on a transmission path of the blue light beam and comprises a wavelength conversion area and a first penetration area, the wavelength conversion area is configured to convert the blue light beam to generate a yellow light beam, the first penetration area is configured to allow passage of the blue light beam, the filter wheel is disposed on transmission paths of the yellow light beam and the blue light beam and comprises a filter area and a second penetration area, the filter area is configured to filter the second red light beam out of the yellow light beam, and the second penetration area is configured to allow passage of the blue light beam.

15. The light source driving method according to claim 9, further comprising:

before the blue light source is driven to output the blue light beam and the red light source is driven to output the first red light beam, driving the projection device to project a black picture.

16. The light source driving method according to claim 9, wherein the red light driving parameter comprises a relation between an output power of the blue light source and the luminance information of the second red light beam and a relation between an output power of the red light source and the luminance information of the first red light beam.

\* \* \* \* \*